UNITED STATES PATENT OFFICE.

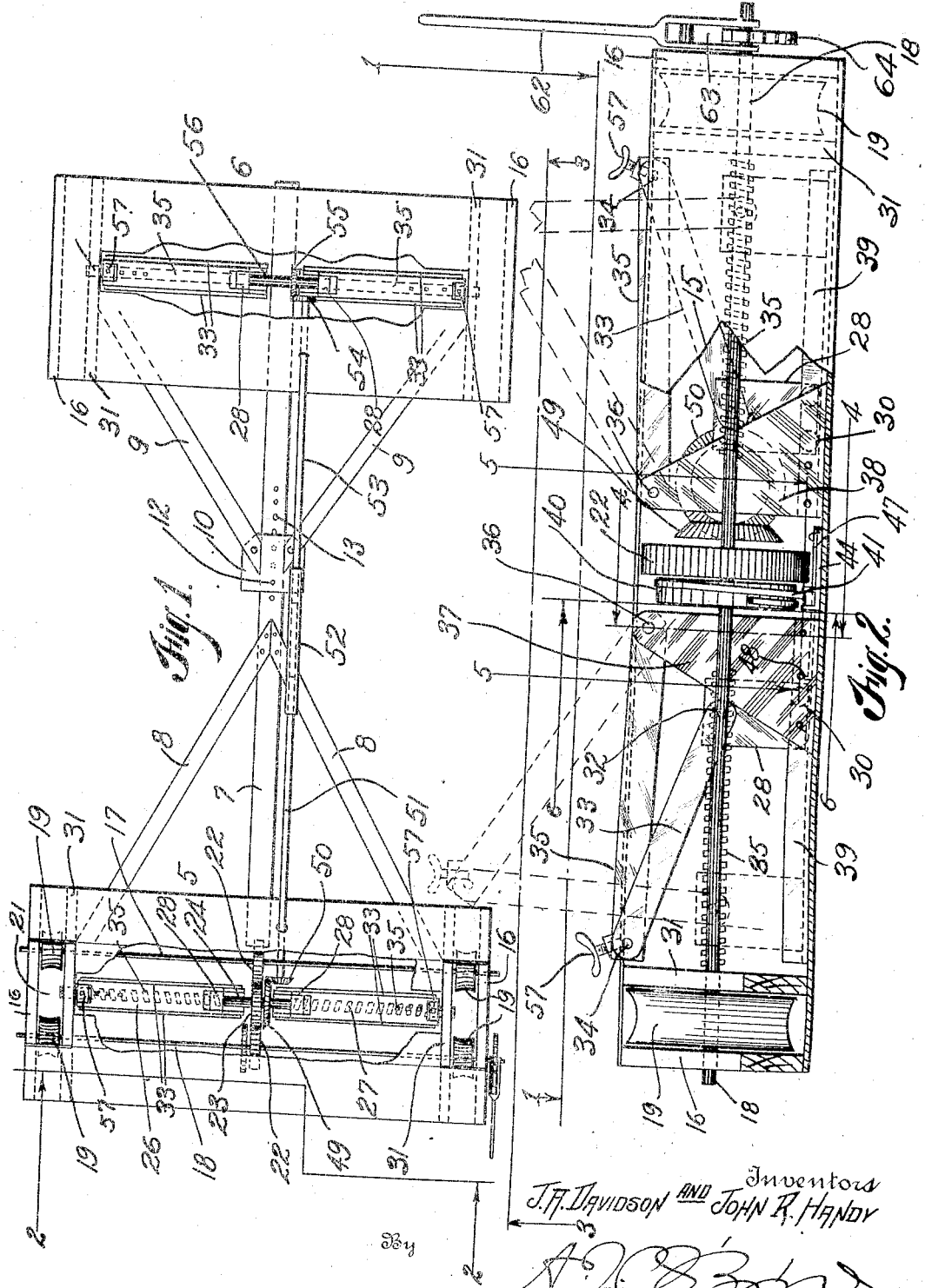

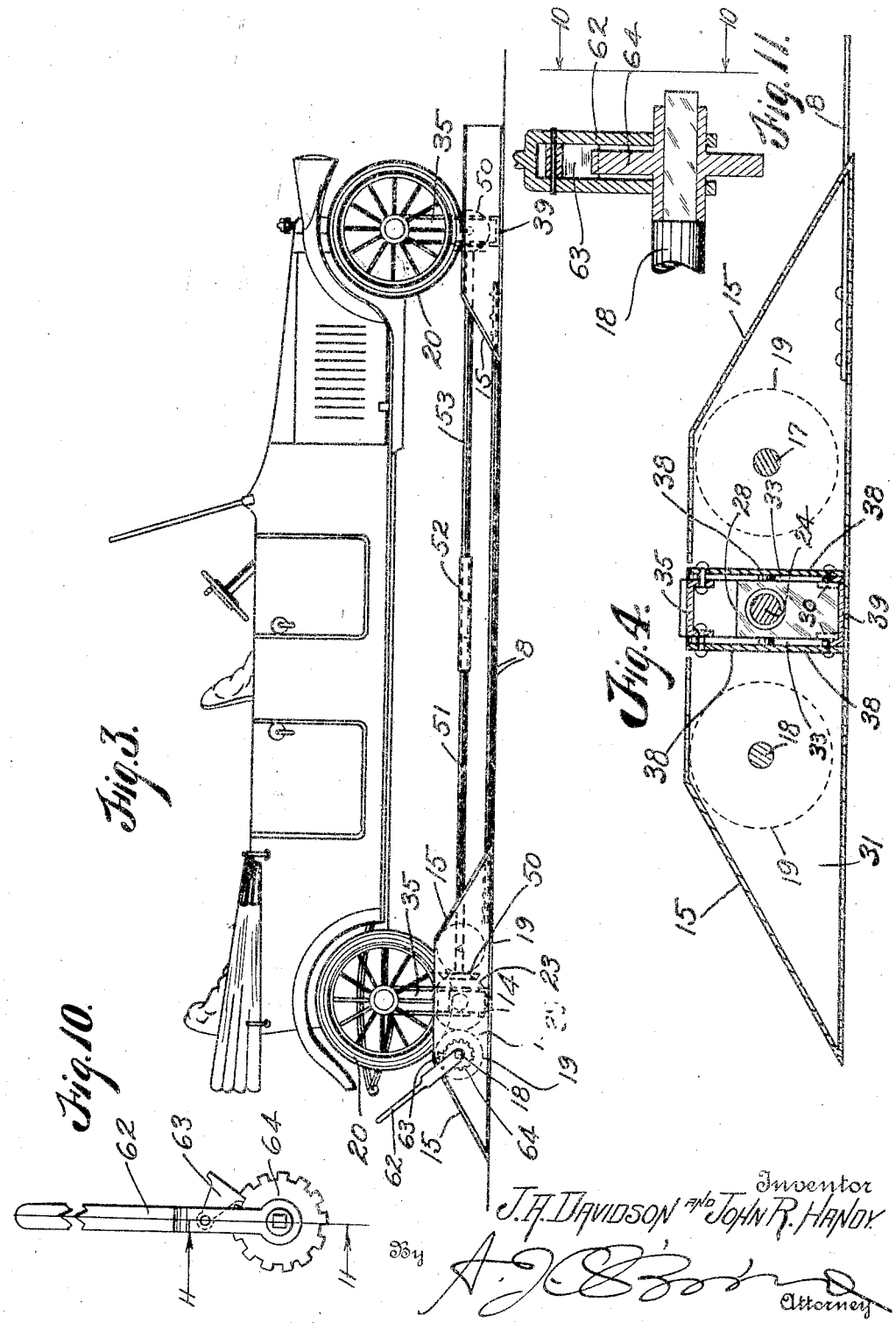

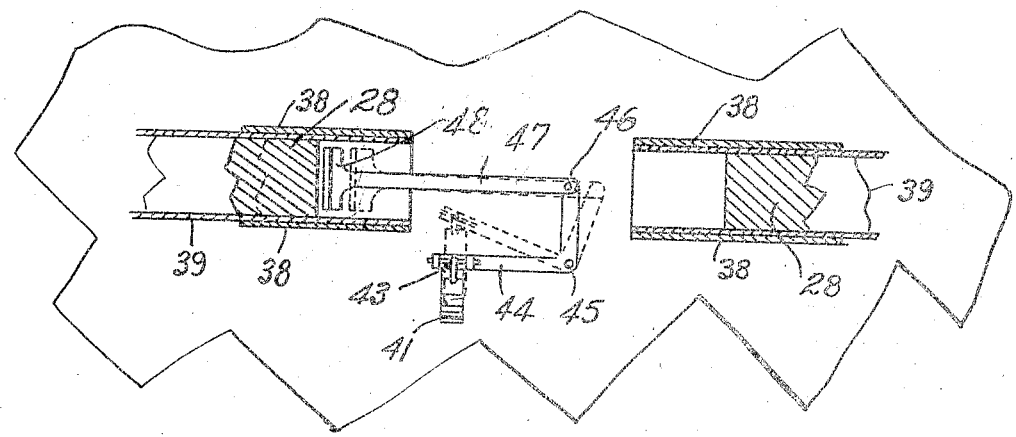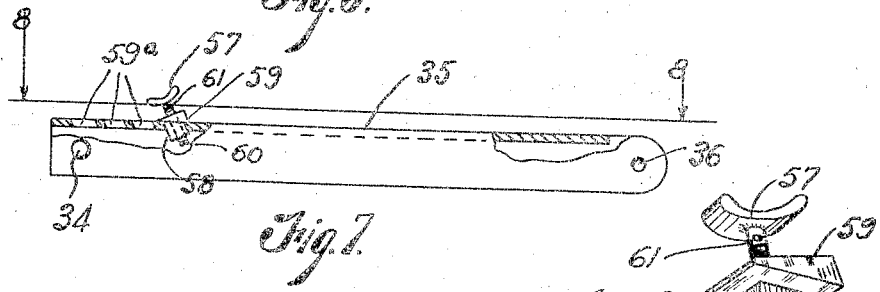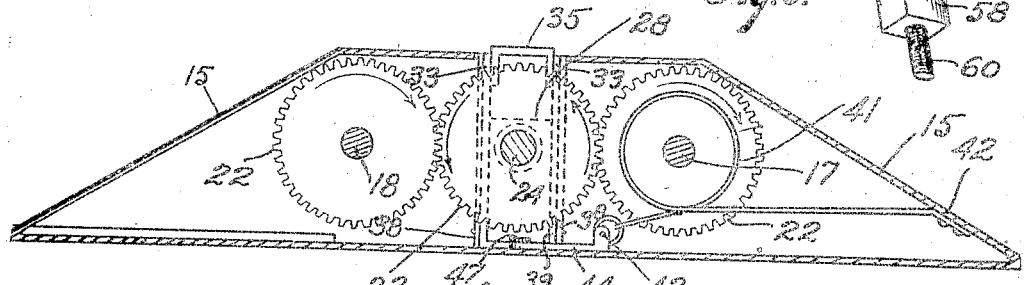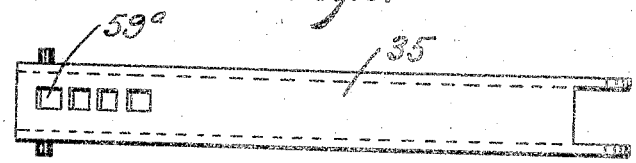

JAMES A. DAVIDSON AND JOHN R. HANDY, OF LOVELAND, COLORADO.

FOUR-WHEEL FLOOR-JACK FOR AUTOMOBILES.

1,321,604. Specification of Letters Patent. Patented Nov. 11, 1919.

Application filed January 11, 1918. Serial No. 211,446.

*To all whom it may concern:*

Be it known that we, JAMES A. DAVIDSON and JOHN R. HANDY, citizens of the United States, residing at Loveland, county of Larimer, and State of Colorado, have invented certain new and useful Improvements in Four-Wheel Floor-Jacks for Automobiles; and we do declare the following to be a full, clear, and exact description of the invention, such as will enable others skilled in the art to which it appertains to make and use the same, reference being had to the accompanying drawings, and to the characters of reference marked thereon, which form a part of this specification.

Our invention relates to what we prefer to term a four-wheel floor jack for automobiles, our object being to provide a construction, whereby the automobile through the medium of its own power may be raised to prevent it from resting upon the tires when standing in a garage. It is well known that where an automobile stands for any considerable length of time and the weight is supported by the tires, that the tires are badly injured under such conditions, thus making it highly desirable that the machine be supported from its axles rather than from its tires. Heretofore, so far as we are aware, no provision has been made for simultaneously and automatically lifting the four wheels of the automobile from the floor of a garage or other surface. Of course, the process of lifting the wheels by the use of the ordinary hand jacks is slow, laborious and unsatisfactory.

Hence, our object is to provide a construction, whereby through the medium of the power of the automobile engine, the machine may be raised sufficiently to prevent the weight from resting upon the tires of the wheels, the weight in such event resting upon supports which engage the two axles at the opposite extremities thereof.

In the accompanying drawing in which is illustrated an embodiment of the improvement:

Figure 1 is a top plan view of our improved floor jack, the casing of the structure being partly broken away to facilitate the disclosure of the mechanism.

Fig. 2 is a section taken on the line 2—2, Fig. 1 looking toward the right, the parts being shown on a much larger scale.

Fig. 3 is a side view of the structure showing an automobile in place.

Fig. 4 is a section taken on the line 4—4, Fig. 2, looking toward the left.

Fig. 5 is a horizontal section taken on the line 5—5, Fig. 2, looking downwardly, the parts being shown on a larger scale.

Fig. 6 is a section taken on the line 6—6, Fig. 2 looking toward the right.

Fig. 7 is a side elevation partly in section showing one member of the toggle structure.

Fig. 8 is a top plan view of the same or a view looking in the direction of arrows 8, Fig. 7.

Fig. 9 is a perspective view of one of the shoes or bearing members which engage the axles when the structure is in use.

Fig. 10 is a die elevation of the ratchet and pawl mechanism for manually actuating the jack, being a view looking in the direction of the arrows 10—10, Fig. 11.

Fig. 11 is a section taken on the line 11—11, Fig. 10, the parts being shown on a larger scale.

The same reference characters indicate the same parts in all the views.

Let the numerals 5 and 6 respectively designate the rear end front members of our improved floor jack, said members being connected by means of a longitudinally disposed beam 7 which is rigidly connected with the rear member 5 by braces 8, while the member 6 is adjustably connected with the said beam and movable longitudinally thereof, the inner extremity of two braces 9 which are connected with the forward member being also secured to a part 10 which is perforated, as shown at 12, to register with the perforations 13 formed in the beam. The forward member may be fastened to the connecting beam by placing a pin in registering perforations 12 and 13 when the member 6 is properly adjusted to correspond with the length of the automobile.

The rear member 5 consists of a casing 14 which is tapered on its front and rear sides, as shown at 15, to facilitate the running of the automobile upon and off the structure. The casing is exteriorly closed at its opposite ends, as shown at 16, and in these closure members are journaled two transversely arranged shafts 17 and 18 upon each of which is made fast one of two rollers 19 whose peripheries are preferably grooved to approximately fit the curvature of the tires 20 of the wheels of the automobile, each pair of rollers being spaced, as shown at 21, to allow the tires to pass downwardly therein a sufficient distance to engage the rollers in coöperative relation when the rear axle is rotated. Each of the shafts 17 and 18 is equipped with a fast gear 22 which meshes with an intermediate gear 23 fast on a shaft 24 equipped with right and left threads 26 and 27 which respectively engage two blocks 28 which are threaded to receive and coöperate with the screw threads of the shaft to cause the blocks to travel in a transverse direction either outwardly for the purpose of raising the machine or inwardly for the purpose of lowering the latter. The casing 14 is provided at its bottom with channel shaped tracks 39 which are engaged by small rollers 30 with which each of the blocks 28 is provided. The opposite extremities of the screw shaft 24 are journaled in parts 31 of the casing which are inwardly spaced from the exterior end parts 16, the two pairs of rollers 19 being positioned in the spaces between the parts 16 and 31, the latter being arranged in parallel relation.

Each of the blocks 28 has pivotally connected thereto at one extremity, as shown at 32, a link or toggle member 33 whose opposite extremity is pivotally connected as shown at 34 with one extremity of a second toggle member 35, the opposite extremity of the latter being pivotally connected as shown at 36 with a stationary support 37 composed of two approximately triangular plates 38, the support 37 being located near the center of the member 5, the lower extremities of the plates 38 being secured to the channel shaped tracks 39. Any suitable provision may be made for mounting the members 37 upon the casing of the structure in such a manner that these parts, together with the channel shaped tracks 39 are relatively stationary.

Mounted on the shaft 18 is a brake drum 40 around which is wrapped, preferably by a single convolution, a brake band or cable 41, one extremity of this cable being secured to the casing, as shown at 42, while its opposite extremity is connected as shown at 43 with an arm 44 of a bell crank lever 45 whose opposite arm is pivotally connected, as shown at 46, with a rod 47 whose opposite extremity is fashioned, as shown at 48, to be engaged by a block 28 as the latter is moved inwardly for the purpose of lowering the automobile to cause it to bear upon its tires preparatory to removing the same from the floor jack. As one of the blocks 28 of the rear member 5 moves inwardly or toward the right, referring to Fig. 2, just before reaching its limit of inward movement, it will engage the head 48 of the rod 47 and actuate the lever 45 to tighten the brake band or cable on the drum 40 and lock the shaft 18, and consequently, the other rotary parts of the member against movement when the blocks 28 and their connections have been properly actuated to lower the machine to cause the rear wheels to rest upon the rollers 19. It will be understood that during this operation the wheels are rotated in a direction the reverse to their normal forward travel, and consequently, as soon as the brake band locks the rotary parts of the jack against further movement, the machine will back off from the jack and move out of the garage. Upon the screw shaft 24 of the rear member 5 is mounted and made fast a bevel gear 49 which meshes with a similar gear 50 fast on a shaft member 51 whose opposite extremity telescopes in a sleeve 52, the end of the shaft being preferably squared to engage an opening of counterpart shape with which the sleeve is provided its entire length. A shaft member 53 also telescopes in the same sleeve and is interlocked therewith in the same manner, the opposite end of the shaft member 53 having a gear 54 which meshes with a similar gear 55 fast on a shaft 56 provided with right and left threads, the same as the screw shaft 24, said threads engaging blocks 28 in the same manner as the screw shaft 24 of the rear member 5. Furthermore, the blocks 28 of the forward member 6 are respectively connected with toggle members 33 and 35 which are mounted in the same manner as those of the rear member 5, as heretofore explained. Each toggle of each front and rear member 5 and 6, carries a shoe 57 which is threaded into a block 58 removably mounted in one of the toggle members 33 and 35 as may be desired. In the drawing, the member 35 is provided with a number of openings 59ᵃ each of which is adapted to receive the member 58 which fits snugly therein and is locked against rotation, the part 58 being polygonal in cross section and the openings 59ᵃ of counterpart shape. The part 58 is also provided with a wedge shaped flange 59 which limits its movement in the opening 59ᵃ and is also shaped to flatly engage the top of the toggle member 35 when the threaded shank 60 of the shoe 57 is in proper position. The threaded shank 60 is adjustable in the part 58 to vary the height of the shoe as different heights may be required when the jack is used with different automobiles. Each shoe 57 is shaped to engage the corresponding axle of the machine.

From this it will be understood that there are four distinct toggles, two for the rear axle and two for the front axle, each toggle carrying an adjustable shoe 57 adapted to engage the axle of the machine.

By reason of the fact that the two shaft members 51 and 53 telescope in the sleeve 52, the two members 5 and 6 of the jack may be moved toward or away from each other as may be required with automobiles whose axles are differently spaced, while at the same time the two screw shafts of the members 5 and 6 will still be connected in operative relation.

From the foregoing description, the use and operation of our improved floor jack will be readily understood. This jack will be located upon the floor of the garage where the automobile is to be kept. As the machine is driven into the garage it is run upon the jack and as the engine continues its movement to rotate the rear wheels in the forward direction, these wheels will engage and operate the four rollers 19 of the rear member 5 and operate the shafts 17 and 18 which coöperate through the medium of the gears 22 and 23 to rotate the screw shaft 24 and through the medium of the gears 49, 50, 54 and 55, the shafts 51 and 53 and the sleeve 52 to rotate the screw shaft 56 of the forward member 6, whereby the four blocks 28 are caused to move outwardly, the two pairs in opposite directions, whereby the toggles are actuated to cause the shoes 57 to engage the two axles of the machine, whereby the latter are elevated to cause the weight of the machine to rest upon the jack, whereby the tires are relieved from pressure. In case it is desired to raise any wheel farther from the jack than would be its normal condition, a hand spike may be inserted in one or more openings 61 with which each threaded shank 60 of the shoes 57 is provided. In this way the shoe may be elevated to further lift the end of either axle, thus making it practicable to remove the tire from any wheel whenever it is desirable or necessary to do so. Again, the entire mechanism may be actuated to further lift the automobile above the jack by means of a ratchet and pawl arrangement consisting of a lever 62 carrying a pawl 63 which engages a ratchet wheel 64 with which one extremity of the shaft is provided (see Fig. 2). By operating this lever the shaft 18 and the two screw shafts 24 and 56 may be manually operated to further lift the machine after the rear wheels are raised sufficiently above the rollers 19 to prevent further automatic operation of the structure.

Attention is called to the fact that while we have described one specific mechanism for lifting the automobile through the medium of the rollers 19 when engaged by the wheels of the automobile, it must be understood that the invention is not limited to this specific structure, since other connections between these rollers and the automobile may be employed without departing from the spirit of the invention.

The lever 62 has a bifurcated lower extremity which straddles the ratchet or toothed wheel 64 and is journaled on the hub of said wheel which has a square perforation to receive the squared end of the shaft 18. Hence, the lever pawl and wheel are readily removable from the squared end of the shaft and as readily applied as case may require.

Having thus described our invention, what we claim is:

1. A floor jack for motor vehicles comprising a base adapted to be movably mounted on a floor, a roller in said base adapted to be engaged by a power wheel of a vehicle, a shaft operatively connected with said roller, said shaft having a worm gear, a block through which said worm gear extends, said block being slidable horizontally in said base, toggles connected with said block, and means connected with said toggles to engage an axle of the vehicle and adapted to be raised by said toggles to elevate said axle.

2. A floor jack for motor vehicles comprising a base, a roller in said base adapted to be engaged by a power wheel of a vehicle, a shaft with which said roller is operatively connected, said shaft having a worm gear, a block in which said worm gear operates, said block being slidable in said base, and lifting means connected with said block and adapted to engage the vehicle.

3. A floor jack for motor vehicles comprising a base, a roller in said base adapted to be engaged by a power wheel of a motor vehicle, braking mechanism operatively connected with said roller, a shaft operatively connected with said roller, a slidable block operable through the medium of said shaft, lifting means connected with said block, and operating means for said braking mechanism adapted to be operated by said block.

4. A floor jack for motor vehicles comprising a base, a roller in said base adapted to be engaged by a power wheel of a motor vehicle, a shaft on which said roller is mounted, a brake member on said shaft, braking mechanism coöperating with said member, a worm gear operatively connected with said shaft, a slidable block in which said worm gear operates, lifting means connected with said block, and operating means for said braking mechanism adapted to be operated by said block when at the limit of its movement in one direction.

In testimony whereof we affix our signatures.

JAMES A. DAVIDSON.
JOHN R. HANDY.